(12) United States Patent
Kokeguchi et al.

(10) Patent No.: US 7,324,259 B2
(45) Date of Patent: Jan. 29, 2008

(54) DISPLAY ELEMENT

(75) Inventors: Noriyuki Kokeguchi, Kokubunji (JP); Satoru Ikesu, Fuchu (JP)

(73) Assignee: Konica Minolta Holdings, Inc., Tokyo (JP)

( * ) Notice: Subject to any disclaimer, the term of this patent is extended or adjusted under 35 U.S.C. 154(b) by 333 days.

(21) Appl. No.: 11/077,846

(22) Filed: Mar. 11, 2005

(65) Prior Publication Data

US 2005/0213186 A1   Sep. 29, 2005

(30) Foreign Application Priority Data

Mar. 26, 2004 (JP) .............................. 2004-091346

(51) Int. Cl.
*G02F 1/15* (2006.01)
*G09G 3/38* (2006.01)
*G09G 3/34* (2006.01)

(52) U.S. Cl. .................. 359/265; 345/105; 345/107

(58) Field of Classification Search ........ 359/267–275; 544/347; 546/257; 252/582, 586; 345/105, 345/107
See application file for complete search history.

(56) References Cited

U.S. PATENT DOCUMENTS

| | | | |
|---|---|---|---|
| 4,550,982 A * | 11/1985 | Hirai ........................... | 359/274 |
| 4,807,977 A * | 2/1989 | Sammells .................... | 359/270 |
| 5,880,872 A | 3/1999 | Udaka et al. | |
| 6,361,709 B1 * | 3/2002 | Bauer et al. ................ | 252/62.2 |
| 6,475,713 B1 * | 11/2002 | Aylward et al. ............ | 430/502 |
| 6,785,035 B2 * | 8/2004 | Uematsu et al. ............ | 359/265 |
| 2002/0064683 A1 * | 5/2002 | Okada et al. ................ | 428/690 |
| 2002/0171081 A1 * | 11/2002 | Vincent et al. ................ | 257/40 |
| 2005/0111070 A1 * | 5/2005 | Lin et al. ..................... | 359/265 |
| 2006/0139724 A1 * | 6/2006 | Liang et al. ................ | 359/265 |
| 2006/0152474 A1 * | 7/2006 | Saito et al. ................. | 345/107 |

FOREIGN PATENT DOCUMENTS

| | | |
|---|---|---|
| EP | 0794453 | 9/1997 |
| EP | 0901034 | 3/1999 |
| SU | 1689442 | 11/1991 |

* cited by examiner

*Primary Examiner*—Scott J. Sugarman
*Assistant Examiner*—DaWayne A. Pinkney
(74) *Attorney, Agent, or Firm*—Lucas & Mercanti, LLP

(57) ABSTRACT

A display element comprising a pair of electrodes having therebetween an electrolyte layer containing silver or a silver-containing compound, the display element being driven by the pair of electrodes so as to electrochemically dissolve silver or to electrochemically deposit silver, wherein the electrolyte layer contains an antioxidant selected from the group consisting of a phenolic antioxidant, a phosphoric acid antioxidant, a sulfur-containing antioxidant, an amine antioxidant and a hydroquinone derivative.

24 Claims, 1 Drawing Sheet

DISPLAY ELEMENT

This application is based on Japanese Patent Application No. 2004-091346 filed on Mar. 26, 2004 in Japanese Patent Office, the entire content of which is hereby incorporated by reference.

TECHNICAL FIELD

The present invention relates to an electrochemical display element utilizing dissolution and deposition of silver.

BACKGROUND OF THE INVENTION

In recent years, along with the increase in the operating speed of personal computers, the spread of network infrastructure, the markedly increased capacity of data storage, and the descrease in price, a further opportunity is increasing in which information such as text and images which have traditionally been supplied in the form of paper printed matter is now acquired and read as convenient electronic information.

Employed as such electronic information reading means are conventional liquid crystal displays as well as CRTs, and in recent years, emissive displays such as organic EL displays are drawn attention. Particularly, when electronic information is in the form of text, it is necessary for an operator to watch the browsing means for a relatively long period of time, which is not a human-conscious operation. Generally, it is known that emissive displays exhibit the following disadvantages: (i) screen flickering results in eye fatigue; (ii) display devices are not portable; (iii) reading posture is limited; (iv) operators tend to gaze at a still screen, and (v) reading over an extended period of time results in an increase of electric power consumption.

Known as display means to overcome such disadvantages are reflective displays (having a memory function) which do not consume power for maintaining images since these displays use external light. However, due to the following reasons, it is difficult to mention that sufficient performance is achieved.

Namely, displays employing polarized plates such as reflective liquid crystals exhibit reflectance as low as approximately 40 percent, resulting in having a problem in displaying white. Further, the production methods employed to prepare constituting members are not simple. Polymer dispersion type liquid crystal displays require relatively high voltage, in addition, since only the difference in the refractive index among organic materials is utilized, the resulting images do not exhibit sufficient contrast. Polymer network type liquid crystal displays result in problems in which a high voltage is required and in order to enhance memory functyions, complicated TFE circuits are required. Display elements based on an electrophoretic method necessitate voltage as high as at least 10 V, and durability problems may occur due to coagulation of electrophoretic particles. Electrochromic display elements can be driven at as low as 3 V, however, color qualities of black and other colors (yellow, magenta, cyan, blue, green, and red) are not sufficient, and in addition, in order to keep the memory function of the display, complicated display constitution may be needed, for example, a constituting layer prepared by an evaporation technique.

Known as a display system which overcomes many of the above mentioned problems is an electrodeposition (hereinafter referred to as ED) display utilizing dissolution and deposition of metals or metal salts. The ED display exhibits advantages such that it is possible to drive the ED system at a voltage below 3 V, the cell structure is simple, the contrast between black and white, as well as the quality of black are excellent. Various methods on ED displays have been disclosed (refer, for example, to Patent Documents 1-3).

However, in the conventional techniques, the durability of the display element at higher temperature and higher humidity has not been fully attained.

(Patent Document 1) U.S. Pat. No. 4,240,716
(Patent Document 2) Japanese Patent Publication No. 3428603
(Patent Document 3) Japanese Patent Publication Open to Public Inspection (hereinafter referred to as JP-A) No. 2003-241227

SUMMARY OF THE INVENTION

An object of the present invention is to provide a display element exhibiting a simple display construction, a low drive voltage, high display contrast, and excellent durability at higher temperature and higher humidity.

An aspect of the present invention includes a display element comprising a pair of electrodes having therebetween an electrolyte layer containing silver or a silver-containing compound, the display element being driven by the pair of electrodes so as to electrochemically dissolve silver or to electrochemically deposit silver, wherein the electrolyte layer contains an antioxidant selected from the group consisting of a phenolic antioxidant, a phosphoric acid antioxidant, a sulfur-containing antioxidant, an amine antioxidant and a hydroquinone derivative.

DESCRIPTION OF THE PREFERRED EMBODIMENTS

Figure 1:
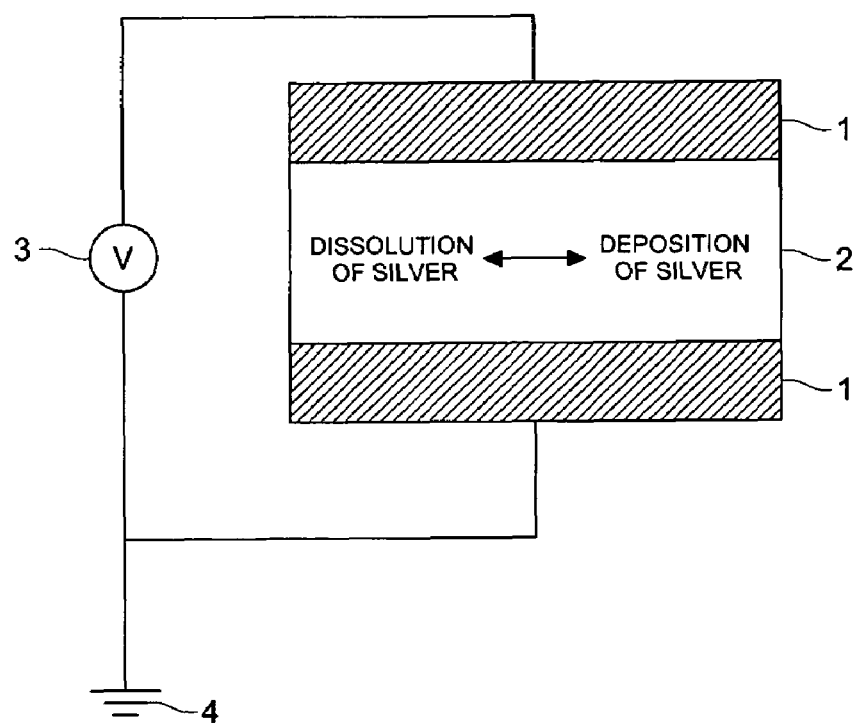
FIG. 1 is a schematic cross-section view illustrating the basic structure of the display element of the present invention.

The above object of the present invention is achieved by the following structures.

(1) A display element comprising a pair of electrodes having therebetween an electrolyte layer containing silver or a silver-containing compound, the display element being driven by the pair of electrodes so as to electrochemically dissolve silver or to electrochemically deposit silver, wherein the electrolyte layer contains an antioxidant selected from the group consisting of a phenolic antioxidant, a phosphoric acid antioxidant, a sulfur-containing antioxidant, an amine antioxidant and a hydroquinone derivative.

(2) A display element comprising a pair of electrodes having therebetween an electrolyte layer containing silver or a silver compound, the display element being driven by the pair of electrodes so as to electrochemically dissolve silver or to electrochemically deposit silver, wherein the electrolyte layer contains a compound represented by Formula (1) or Formula (2):

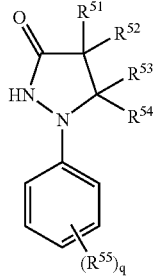

Formula (1)

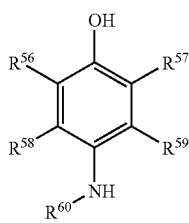

Formula (2)

wherein in Formula (1) and Formula (2):

$R^{51}$-$R^{54}$ each represents a hydrogen atom, an alkyl group, a cycloalkyl group, an alkenyl group, an aryl group, or a heterocycle group;

$R^{55}$-$R^{59}$ each represents a hydrogen atom, a halogen atom, a cyano group, an alkyl group, a cycloalkyl group, an alkenyl group, an aryl group, a heterocycle group, an alkoxy group, a cycloalkyloxy group, an aryloxy group, a heterocyclicoxy group, a silyloxy group, an acyloxy group, an amino group, an anilino group, a heterocyclic amino group, an alkylthio group, an arylthio group, a heterocyclicthio group, a silyl group, a hydroxyl group, a nitro group, an alkoxycarbonyloxy group, a cycloalkyloxycarbonyloxy group, an aryloxycarbonyloxy group, a carbamoyloxy group, a sulfamoyloxy group, an alkanesulfonyloxy group, an arenesulfonyloxy group, an acyl group, an alkoxycarbonyl group, a cycloalkyloxycarbonyl group, an aryloxycarbonyl group, a carbamoyl group, a carbonamido group, a ureido group, an imido group, an alkoxycarbonylamino group, an aryloxycarbonylamino group, a sulfonamido group, a sulfamoylamino group, an alkylsulfinyl group, an arenesulfinyl group, an alkanesulfonyl group, an arenesulfonyl group, a sulfamoyl group, a sulfo group, a phosphinoyl group, or a phosphinoylamino group;

q represents a integer of 0 to 5, and when q is two or more, each $R^{55}$ may be different; and $R^{60}$ represents an alkyl group or an aryl group.

(3) A display element comprising a pair of electrodes having therebetween an electrolyte layer containing silver or a silver compound, the display element being driven by the pair of electrodes so as to electrochemically dissolve silver or to electrochemically deposit silver, wherein the electrolyte layer contains a dehydration agent.

(4) The display element of any one of Items (1) to (3), wherein the electrolyte layer further contains a compound having a mercapto group and the electrolyte layer satisfies Formula (3):

$2 \leq [\text{—SH}]/[\text{Ag}] \leq 10$   Formula (3)

wherein:

[—SH] represents a total number of moles of sulfur contained in the compound having a mercapto group; and

[Ag] represents a total number of moles of silver contained in the electrolyte layer.

(5) The display element of any one of Items (1) to (4), wherein the electrolyte layer further contains a solvent selected from the group consisting of:

propylene carbonate, ethylene carbonate, ethylmethyl carbonate, diethyl carbonate, dimethyl carbonate, butylene carbonate, γ-butyrolactone, tetramethylurea, sulfolane, dimethyl sulfoxide, 1,3-dimethyl-2-imidazolidinone, 2-(N-methyl)-2-pyrrolidinone, hexamethylphosphortriamide, N-methylpropione amide, N,N-dimethylacetamide, N-methylacetamide, N,N-dimethylformamide, N-methylformamide, butyronitrile, propionitrile, acetonitrile, acetylacetone, 4-methyl-2-pentanone, 2-butanol, 1-butanol, 2-propanol, 1-propanol, ethanol, methanol, an acetic anhydride, ethylacetate, ethyl propionate, dimethoxy ethane, diethoxyfuran, tetrahydrofuran, ethylene glycol, diethylene glycol, triethylene glycol monobutyl ether, and water.

(6) The display element of any one of Items (1) to (5), wherein the electrolyte layer further contains white particles.

(7) The display element of any one of Items (1) to (6), wherein the electrolyte layer further contains a thickener selected from the group consisting of:

polyvinyl alcohol, hydroxypropyl cellulose, polyalkylene glycol and polyvinyl pyrrolidone.

(8) The display element of any one of Items (1) to-(7), wherein one of the pair of electrodes is a metal electrode.

(9) The display element of any one of Items (1) to (8), wherein one of the pair of electrodes is a transparent electrode.

(10) The display element of any one of Items (1) to (9), wherein a display element operation is simple matrix drive.

The display element of the present invention will now be detailed.

It was found that a display element exhibiting:

(i) a simple display construction;
(ii) a low drive voltage;
(iii) high display contrast; and
(iv) excellent durability at higher temperature and higher humidity, is achieved by the construction of the display element containing a pair of electrodes having therebetween an electrolyte layer containing silver or a silver-containing compound, the display element being driven by the pair of electrodes so as to electrochemically dissolve silver or to electrochemically deposit silver, wherein:

1) the electrolyte layer contains an antioxidant selected from the group consisting of a phenolic antioxidant, a phosphoric acid antioxidant, a sulfur-containing antioxidant, an amine antioxidant and a hydroquinone derivative;

2) the electrolyte layer contains a compound represented by Formula (1) or Formula (2); and 3) the electrolyte layer contains a dehydration agent.

[Silver or Silver-Containing Compounds]

The term "silver or compounds containing silver in the molecule", according to the present invention, is a general term referring to compounds such as silver oxide, silver sulfide, metallic silver, colloidal silver particles, silver halide, silver complex compounds, or silver ions, and phase states such as a solid state, a dissolved state in a liquid, or a gaseous state, as well as charge states such as a neutral state, an anionic state, or a cationic state are not particularly specified.

[Basic Structure of the Cell]

FIG. 1 is a schematic cross-sectional view illustrating the basic structure of the display element of the present invention.

As shown in FIG. 1, the display element of the present invention incorporates electrolyte layer 2 between paired electrodes 1. In the display element, the display state is varied utilizing differences in optical properties of the silver-containing compound such as transmission and absorption of light. The optical properties of silver-containing compound is changed by dissolving silver in electrolyte layer 2 or depositing silver from electrolyte layer 2 by applying voltage or current through the paired electrodes 1 from power source 3.

[Antioxidants]

The display element of the present invention is characterized in that the electrolyte layer incorporates at least one compound selected from the group consisting of a phenolic antioxidant, a phosphoric acid antioxidant, a sulfur-containing antioxidant, an amine antioxidant and a hydroquinone derivative. The antioxidants according to the present invention will now be described with reference to specific examples, however, the present invention is not limited thereto.

(Phenolic Antioxidants)

Phenolic antioxidants are roughly classified into (i) a monophenolic antioxidant, (ii) a polyphenolic antioxidant, (iii) a polymerized phenolic antioxidant and (iv) a hindered phenolic antioxidant, with respect to the structure.

<Monophenolic Antioxidants>

Examples of a monophenolic antioxidant include: 2,6-di-t-butyl-p-cresol, butylated hydroxyanisole, 2,6-di-t-butyl-4-ethylphenol, stearyl-β-(3,5-di-t-butyl-4-hydroxyphenyl) propionate, 1-oxy-3-methyl-4-isopropylbenzene, 2,6-di-t-butyl-4-methylphenol, 2,6-di-t-butyl-4-sec-butylphenol, 2-(1-methylcyclohexyl)-4,6-dimethylphenol, 2,6-t-butyl-α-dimethylamino-p-cresol, a mixture of 2,6-di-t-butyl phenol and 2,4,6-tri-t-butyl phenol, styrenated phenol, alkylated phenol, and a mixture of alkyl substituted phenol and aralkyl substituted phenol.

<Polyphenolic Antioxidants and Polymeried Phenolic Antioxidants>

Examples of a polyphenolic antioxidant and a polymeried phenolic antioxidant include: 2,2'-methylenebis(4-methyl-6-t-butylphenol), 2,2'-methylenebis(4-ethyl-6-t-butylphenol), 4,4'-thiobis(3-methyl-6-t-butylphenol), 3,9-bis[1,1-dimethyl-2-[β(3-t-butyl-4-hydroxy-5-methylphenyl)propionyloxy]ethyl]-2,4,8,10-tetra-oxaspiro[5,5]undecane, 2,2-methylene-bis-(4-methyl-6-cyclohexylphenol), 4,4'-methylene-bis(2,6-di-t-butylphenol), 2,2'-methylene-bis(6-α-methyl-benzyl-p-cresol), methylene bridged multivalent alkylphenol, 4,4'-butylidene-bis(6-t-butyl-m-cresol), 2,2'-ethylidene-bis(4,6-di-t-butylphenol), 1,1-bis(4-hydroxyphenyl)cyclohexane, 2,2'-dihydroxy-3,3'-di(α-methylcyclohexyl)-5,5'-dimethyl-diphenylmethane, alkylated bisphenol, butylated products of p-cresol and dicyclopentadiene, a mixture of poly butylated bisphenol A, 1,3,5-trimethyl-2,4,6-tris(3,5-di-t-butyl-4-hydroxybenzyl)benzene, 1,3,5-tris(4-t-butyl-3-hydroxy-2,6-dimethylbenzyl)isocyanurate, 2-t-butyl-6-(3'-t-butyl-5'-methyl-2'-hydroxybenzyl)-4-methylphenyl acrylate, 2-[1-(hydroxy-3,5-di-t-pentylphenyl)ethyl]-4,6-di-t-pentylphenyl acrylate, 3,9-bis[2-{3-(3-t-butyl-4-hydroxy-5-methylphenyl)propionyloxy}-1,1-dimethylethyl]-2,4,8,10-tetraoxyspiro[5,5]undecane, butylacid-3,3-bis(3-t-butyl-4 hydroxyphenyl) ethylene ester, 3,5-di-t-butyl-4-hydroxy hydrocinnamic acid triester of 1,3,5-tri(2-hydroxyethyl)-s-triazine-2,4,6-(1H,3H,5H)trione, and modofied polyalkyl phosphorous acid chlorinated polyhydric phenol.

<Hindered Phenol Compounds>

Examples of a hindered phenol compound include: 1,1,3-tris(2-methyl-4-hydroxy-5-t-butylphenyl)butane, 4,4'-butylidenebis(3-methyl-6-t-butylphenol), 2,2-thiobis(4-methyl-6-t-butylphenol), n-octadecyl-3-(4'-hydroxy-3',5'-di-t-butylphenyl)propionate, tetrakis-[methylene-3-(3',5'-di-t-butyl-4-hydroxyphenyl)propionate]methane, pentaerythritol-tetrakis[3-(3,5-di-t-butyl-4-hydroxyphenyl) propionate], triethylene-glycol-bis[3-(3-t-butyl-t-methyl-4-hydroxyphenyl) propionate], 2,4-bis(n-octylthio)-6-(4-hydroxy-3,5-di-t-butylanilino)-1,3,5-triazine, tris-(3,5-di-t-butyl-4-hydroxybenzyl)isocyanurate, 2,2-thio-diethylenebis[3-(3,5-di-t-butyl-4-hydroxyphenyl)propionate], N,N'-hexamethylenebis(3,5-di-t-butyl-4-hydroxy-hydroxycinnamamide), 2,4-bis[(octylthio)methyl]-o-cresol, 1:1 mixture of bis(3,5-di-t-butyl-4-hydroxybenzylphosphonic acid ethyl)calcium and polyethylene wax, 3,5-di-t-butyl-4-hydroxybenzylphosphonate-diethyl ester, tetrakis[methylene(3,5-di-t-butyl-4-hydroxyhydrocinnamate)]methane, octadecyl-3-(3,5-di-t-butyl-4-hydroxyphenyl)propionate, hindered bisphenol.

(Phosphoric Acid Antioxidants)

Examples of a phosphoric acid system antioxidant include: triphenyl phosphite, diphenylisodecyl phosphite, phenylisodecyl phosphite, 4,4'-butylidene-bis(3-methyl-6-t-butylphenylditridecyl)phosphite, octadecyl phosphite, tris(nonylphenyl)phosphite, tris(mono- or dinonylphenyl) phosphite, diisodecylpentaerythritol diphosphite, 9,10-dihydro-9-oxa-10-phosphaphenanthrene=10-oxide, 10-(3,5-di-t-butyl-4-hydroxybenzyl)-9,10-dihydro-9-oxa-10-phosphaphenanthrene-10-oxide, 10-deciloxy-9,10-dihydro-9-oxa-10-phosphaphenanthrene, tris(2,4-di-t-butylphenyl) phosphite, cyclic neopentane tetrayl bis(2,4-di-t-butylphenyl)phosphite, cyclic neopentane tetrayl bis(2, 6-di-t-butyl-4-methylphenyl)phosphite, 2,2-methylenebis(4,6-di-t-butylphenyl)octyl phosphite, tetraphenyltetra(tridecyl) pentaerythritol tetraphosphite, 2,2'-ethylidenebis(4,6-di-t-butylphenol)fluorophosphite, 4,4'-isopropylidene-diphenolalkyl (C12-C15) phosphite, bis(nonylphenyl) pentaerythritol diphosphite, dibutyl hydrogen phosphite, distearyl pentaerythritol diphosphite, phosphorous acid esters.

(Sulfur-Containing Antioxidants)

Examples of a sulfur-containing antioxidant include: dilauryl thiodipropionate, distearyl thiodipropionate, dimyristyl-3,3'-thiodipropionate, ditridecyl-3,3'-thiodipropionate, pentaerythritol-tetrakis(β-lauryl-thiopropionate), dilauryl thiodipropionate, β-alkyl thioester propionate, a sulfur-containing ester compound, 2-mercaptobenzimidazole, 2-mercaptomethylbenzimidazole, mixture of phenol condensation product and 2-mercaptobenzimidazole, zinc salt of 2-mercaptobenzimidazole, zinc salt of 2-mercaptomethylbenzimidazole and dioctadecyl sulfide.

(Amine Antioxidants)

Examples of an amine antioxidant include: phenyl-α-naphthylamine, phenyl-β-naphthylamine, p-(p-toluene sulfonylamide)diphenylamine, 4,4'-(α,(α-dimethylbenzyl) diphenylamine, 4,4'-dioctyl diphenylamine, reaction product of diphenylamine and acetone, reaction product of diphenylamine and aniline, octyl-diphenylamine, dioctyl-diphenylamine, p,p'-dioctyl-diphenylamine, N,N'-diphenyl-p-phenylenediamine, N-isopropyl-N'-phenyl-p-phenylenediamine, N,N'-di-2-naphthyl-p-phenylenediamine, N-cyclohexyl-N'-phenyl-p-phenylenediamine, N-phenyl-N'-(3-methacryloyloxy-2-hydroxypropyl)-P-phenylenediamine, N,N'-bis(1-methylheptyl)-p-phenylenediamine, N,N'-bis(1,4-dimethylpentyl)-p-phenylenediamine, N,N'-bis(1-ethyl-3-methylpentyl)-p-phenylenediamine and N-(1,3-dimethylbutyl)-N'-phenyl-p-phenylenediamine. Amine compounds disclosed in pages 11-34 of JP-A No. 9-120126 are also preferably usable.

(Hydroquinone Derivatives)

Examples of a hydroquinone derivative include: 2,5-di-(t-amyl)hydroquinone, 2,5-di-t-butylhydroquinone and hydroquinone monomethyl ether.

In addition to the above mentioned compounds, antioxidants disclosed in U.S. Pat. Nos. 3,582,333, 3,671,248, 3,902,905 and 3,522,053; JP-A Nos. 61-91651, 57-176032, 56-52734 and 58-28714; JP-B No. 43-4133; and GB Patent No. 2,054,187 may be used together with the above compounds.

Among the above described antioxidants, phenolic antioxidants and amine antioxidants are preferably usable.

The amount of antioxidant used in the present invention is preferably 0.1 to 10 g and more preferably 1 to 10 g, based on 1 kg of electrolyte.

[Electron Emitting Compounds]

One of the characteristic features of the display element of the present invention is that the electrolyte layer contains, as a main silver developing chemical, a compound represented by Formula (1) or (2), which emits electrons according to Kendall-Perutz rule.

In Formula (1) and Formula (2), $R^{51}$-$R^{54}$ each represents a hydrogen atom, an alkyl group, a cycloalkyl group, an alkenyl group, an aryl group, or a heterocycle group.

$R^{55}$-$R^{59}$ each represents a hydrogen atom, a halogen atom, a cyano group, an alkyl group, a cycloalkyl group, an alkenyl group, an aryl group, a heterocycle group, an alkoxy group, a cycloalkyloxy group, an aryloxy group, a heterocyclic oxy group, a silyloxy group, an acyloxy group, an amino group, an anilino group, a heterocycle amino group, an alkylthio group, an arylthio group, a heterocycle thio group, a silyl group, a hydroxyl group, a nitro group, an alkoxycarbonyloxy group, a cycloalkyloxycarbonyloxy group, an aryloxycarbonyloxy group, a carbamoyloxy group, a sulfamoyloxy group, an alkanesulfonyloxy group, an arenesulfonyloxy group, an acyl group, an alkoxycarbonyl group, a cycloalkyloxycarbonyl group, an aryloxycarbonyl group, a carbamoyl group, a carbonamido group, a ureido group, an imido group, an alkoxycarbonylamino group, an aryloxycarbonylamino group, a sulfonamido group, a sulfamoylamino group, an alkylsulfinyl group, an arenesulfinyl group, an alkanesulfonyl group, an arenesulfonyl group, a sulfamoyl group, a sulfo group, a phosphinoyl group, or a phosphinoylamino group.

q represents a integer of 0 to 5, and when q is two or more, each $R^{55}$ may be different. $R^{60}$ represents an alkyl group or an aryl group.

Specific compounds represented by Formula (1) or (2) will be shown below, however, the present invention is not limited thereto.

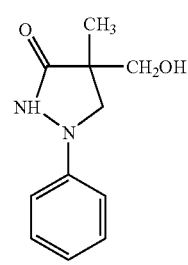

(ETA-1)

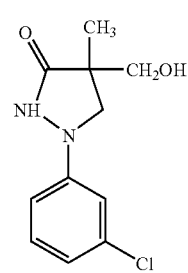

(ETA-2)

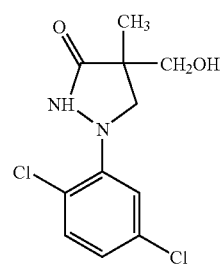

(ETA-3)

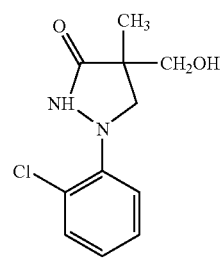

(ETA-4)

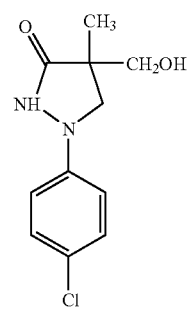

(ETA-5)

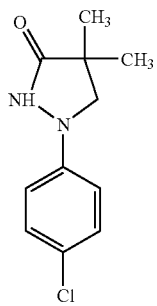
(ETA-6)
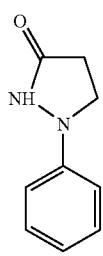
(ETA-7)
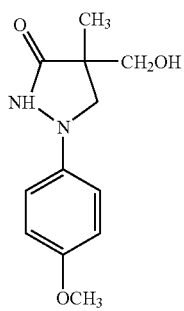
(ETA-8)
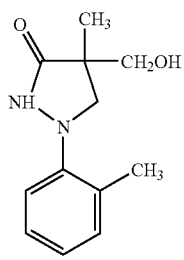
(ETA-9)
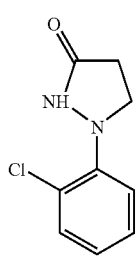
(ETA-10)
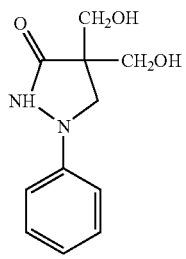
(ETA-11)
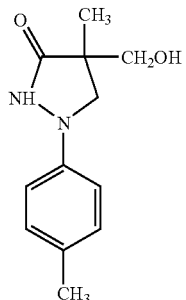
(ETA-12)
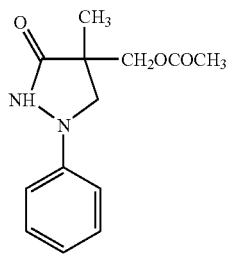
(ETA-13)
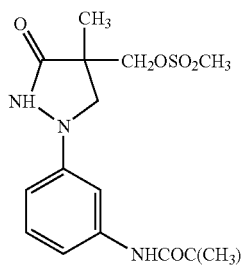
(ETA-14)
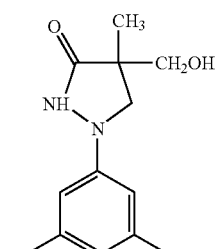
(ETA-15)
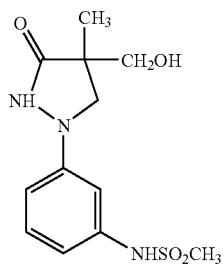
(ETA-16)

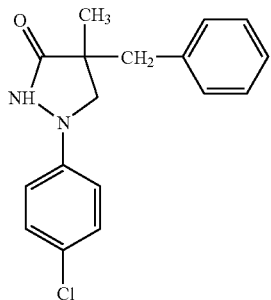 (ETA-17)
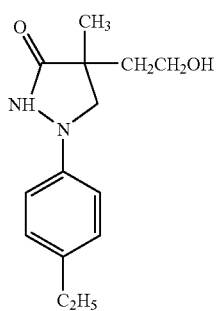 (ETA-18)
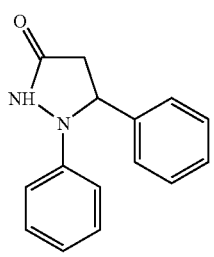 (ETA-19)
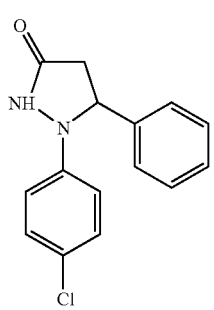 (ETA-20)
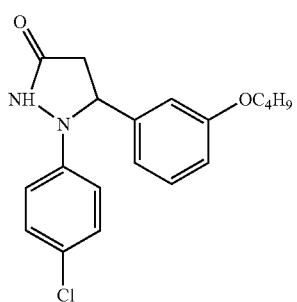 (ETA-21)
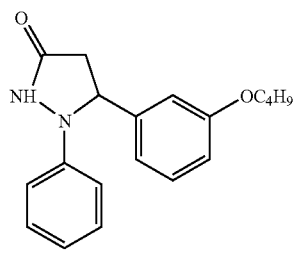 (ETA-22)
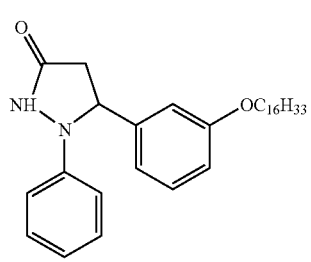 (ETA-23)
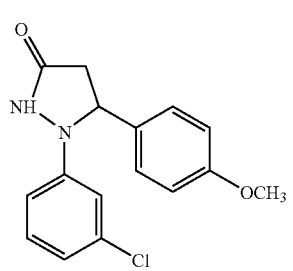 (ETA-24)
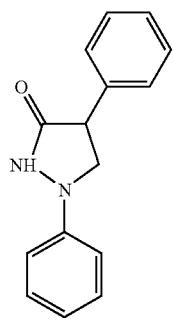 (ETA-25)
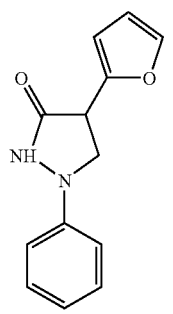 (ETA-26)

-continued
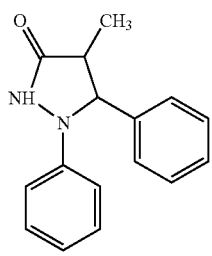
(ETA-27)
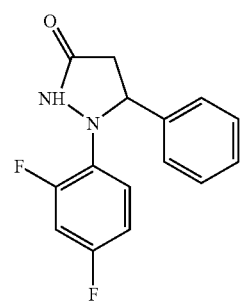
(ETA-32)
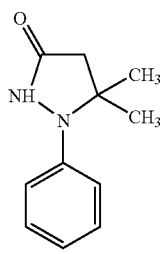
(ETA-28)
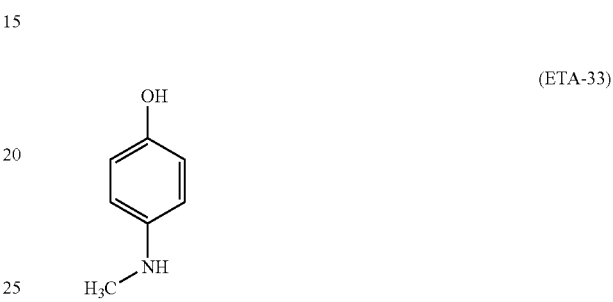
(ETA-33)
(ETA-29)
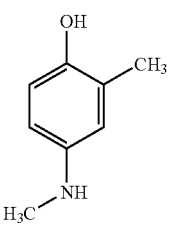
(ETA-34)
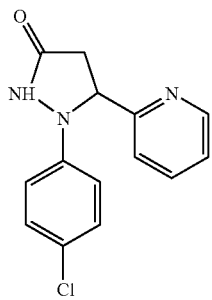
(ETA-30)
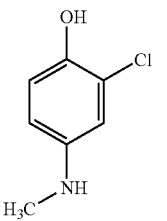
(ETA-35)
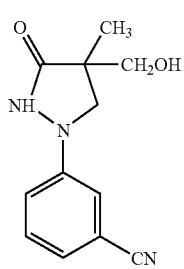
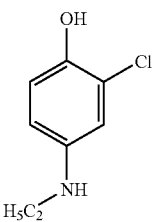
(ETA-36)
(ETA-31)
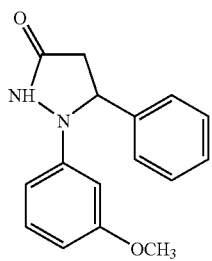
The role of the compound represented by the above Formula (1) or (2) in the display element of the present invention is assumed to be as follows.
While the compound represented by above Formula (1) or (2) and silver coexist, no silver blackening reaction occurs. However, when oxidation or reduction is carried out using the pair of electrodes, an oxidant or a reductant of the compound represented by Formula (1) or (2) is formed, then, above mentioned oxidant or reductant reacts with silver or blackened silver to convert silver to blackened silver (oxidation) or convert blackened silver to silver (reduction), whereby an apparent oxidation-reduction rate is enhanced. One of the novel technical concepts of the present invention is that the electrochemical oxidation-reduction reaction of silver, carried out by using the paired electrodes, is performed via the compound represented by above Formula (1) or (2).

(Dehydrating Agents)

One of the features of the display element of the present invention is that the electrolyte layer incorporates a dehydrating agent.

In the present invention, the term "a dehydrating agent" refers to a general term for a compound capable of absorbing water by itself, utilizing chemical reactions as well as physical adsorption, to remove water from a system. Required properties for a dehydrating agent are: (i) no reaction with coexisting organic compounds; (ii) a high dehydration rate; (iii) a high dehydration capacity; (iv) low solubility in organic solvents; (v) no re-releasing of absorbed water; (vi) no catalytic action for polymerization or condensation; and (vii) low cost.

Examples of dehydrating agents usable in the present invention include: anhydrous sodium sulfate, anhydrous calcium chloride, anhydrous magnesium sulfate, anhydrous potassium carbonate, sodium hydroxide, potassium hydroxide, calcium oxide, aluminum oxide, anhydrous boric acid, anhydrous phosphoric acid, sodium metal, concentrated sulfuric acid, silane coupling agents, acetic anhydride, zeolite, active carbon, molecular sieve, silica gel, water absorptive polymers such as polyacrylamides, and water reactive monomers such as cyanoacrylate or trifluoromethyl acrylate. However, the present invention is not limited thereto.

Further, in a case when white pigment is employed in the electrolyte layer, the dehydrating agent may not be transparent in the visible region. The dehydrating agent itself may behave as a white scattering material.

(Ratio of Total Number of Moles of Silver and a Mercapto Group)

The display element of the present invention is characterized in that the relationship of $2 \leq [-SH]/[Ag] \leq 10$ is satisfied, wherein [—SH] represents the total number of moles of sulfur contained in the compound containing the mercapto group, and [Ag] represents the total number of moles of silver in the compound-containing silver. When [—SH]/[Ag] is less than 2, silver is not sufficiently blocked, and under high temperature and high humidity, or in cases in which basic compounds coexist, blackening of silver proceeds, whereby the reflection ratio of white is reduced and whiteness is degraded. On the other hand, when [—SH]/[Ag] exceeds 10, the dissolution rate of blackened silver increases due to mercapto compounds, whereby durability of the formed image at high temperature and high humidity is degraded. In the present invention, the more preferred range is $2.5 \leq [-SH]/[Ag] \leq 5$.

Further, preferred as mercapto compounds are those which satisfy the condition of $50 \leq$ [molecular weight of a mercapto compound] $\leq 149$.

When the molecular weight of mercapto compounds is less than 50, workability suffers due to unpleasant odor. Alternatively, when it exceeds 150, the number of moles of the mercapto compound becomes smaller when the same weight of the compound is used, resulting in a decrease in solubility of the compounds necessary to retain electrical conductivity, whereby the driving rate is decreased. When the number of moles of the mercapto compound decreases, the solubility of the compound necessary to retain electrical conductivity of the electrolyte also decreases, because the solubility depends on the number of the mercapto group existing in the electrolyte.

Further, it is preferable that a plurality of mercapto compounds are employed in combination. By incorporating a plularity of mercapto compounds, it is possible to increase the concentration of dissolved silver and to minimize deposition at low temperature of the electrolyte solution.

Silver ion concentration (Ag) in the electrolyte layer is preferably $0.2 \text{ mol/L} \leq (Ag) \leq 2.0 \text{ mol/L}$. When the silver ion concentration is less than 0.2 mol/L, a diluted silver ion liquid is formed, resulting in a decrease in the driving rate. Further, when it exceeds 2 mol/L, solubility of the silver-containing compound is degraded whereby undesired deposition tends to be formed during storage at low temperature.

In the display element of the present invention, it is preferable that a silver-dissolving solution is prepared by dissolving a silver salt of a mercapto compound in a solvent.

When silver salts are dissolved in solvents, commonly employed as silver salts are silver halides such as silver iodide, silver chloride, or silver bromide, as well as organic silver salts such as silver citrate, silver oxalate, or silver behenate. However, in order to maximize the solubility of silver in electrolytes, it is advantageous that mercapto silver salts are previously prepared, followed by dissolution to electrolytes. Further, during the production process, when high temperature treatment at approximately 120° C. is required in the process, in view of the ease of process operation, and enhancement of stability of electrolytes, it is preferable to previously block silver employing a mercapto group to reduce discoloration due to blackening.

Listed examples as preferable mercapto silver salts include, for example, silver salts of mercaptobenzimidazole, mercaptoimidazole, mercaptobenzotriazole, mercaptotriazole, and mercaptothiadiazole. It is also preferable that electrolytes are prepared in such a manner that silver salts of mercapto compounds and the same type of the mercapto compounds are separately added. By separartely adding the same types of mercapto compounds, so-called solvent shock (which may occur when different solvents are mixed together) due to coexisting compounds during addition of silver salts of the mercapto compounds is reduced, whereby it is possible to shorten the liquid standing time which is required to allow uniform arrangement of chemical species.

[Electrolyte Solvents]

In the display element of the present invention, the electrolyte layer preferably contains one solvent selected from the group consisting of: propylene carbonate, ethylene carbonate, ethylmethyl carbonate, diethyl carbonate, dimethyl carbonate, butylene carbonate, γ-butyrolactone, tetramethylurea, sulfolane, dimethyl sulfoxide, 1,3-dimethyl-2-imidazolidinone, 2-(N-methyl)-2-pyrrolidinone, hexamethylphosphortriamide, N-methylpropioneamide, N,N-dimethylacetamide, N-methylacetamide, N,N-dimethylformamide, N-methylformamide, butyronitrile, propionitrile, acetonitrile, acetylacetone, 4-methyl-2-pentanone, 2-butanol, 1-butanol, 2-propanol, 1-propanol, ethanol, methanol, acetic anhydride, ethyl acetate, ethyl propionate, dimethoxy ethane, diethoxyfuran, tetrahydrofuran, ethylene glycol, diethylene glycol, triethylene glycol monobutyl ether, and water.

It is preferable that at least one solvent having the freezing point of not more than −20° C., and the boiling point of not less than 120° C. is contained, examples of which include: propylene carbonate, ethylene carbonate, ethylmethyl carbonate, diethyl carbonate, γ-butyrolactone, 2-(N-methyl)-2-pyrrolidinone, N-methylpropione amide, N,N-dimethylformamide, and acetylacetone.

Other solvents usable in the present invention may be those shown in, for example, J. A. Riddick, W. B. Bunger, T. K. Sakano, "Organic Solvents", 4th ed., John Wiley & Sons (1986), Y. Marcus, "Ion Solvation", John Wiley & Sons (1985), C. Reichardt, "Solvents and Solvent Effects in Chemistry", 2nd ed., VCH (1988), G. J. Janz, R. P. T. Tomkins, "Nonaqueous Electorlytes Handbook", Vol. 1, Academic Press (1972).

[Electrolyte Materials]

In the display element of the present invention, when electrolytes are in liquid form, it is possible to incorporate, in the electrolytes, the following compounds. Listed as potassium compounds are KCl, KI, and KBr; listed as lithium compounds are $LiBF_4$, $LiClO_4$, $LiPF_6$, and $LiCF_3SO_3$; while listed as tetraalkylammonium compounds are tetraethylammonium perchlorate, tetrabutylammonium perchlorate, tetraethylammonim borofluoride, tetrabutylammonium borofluoride, and tetrabutylammonium halide. In addition, preferably used are fused salt electrolyte compositions described in paragraphs [0062]-[0081] of JP-A No. 2003-187881. Further employed are compounds which form oxidation-reduction pairs such as $I^-/I_3^-$, $Br^-/Br_3^-$ and quinone/hydroquinone.

Further, when electrolytes are in solid form, it is possible to incorporate, in the electrolytes, the following compounds which exhibit electronic or ionic conductivity.

Listed are fluorinated vinyl based polymers containing perfluorosulfonic acid, polythiophene, polyaniline, polypyrrol, triphenylamines, polyvinylcarbazoles, polymethylphenylsilanes, calcogenides such as $Cu_2S$, $Ag_2S$, $Cu_2Se$, or $AgCrSe_2$, fluorine compounds such as $CaF_2$, $PbF_2$, $SrF_2$, $LaF_3$, $TlSn_2F_5$, or $CeF_3$, lithium salts such as $Li_2SO_4$, $Li_4SiO_4$, or $Li_3PO_4$, as well as compounds such as $ZrO_2$, $CaO$, $Cd_2O_3$, $HfO_2$, $Y_2O_3$, $Nb_2O_5$, $WO_3$, $Bi_2O_3$, AgBr, AgI, CuCl, CuBr, CuI, LiI, LiBr, LiCl, $LiAlCl_4$, $LiAlF_4$, AgSBr, $C_5H_5NHAg_5I_6$, $Rb_4Cu_{16}I_7Cl_{13}$, $Rb_3Cu_7Cl_{10}$, LiN, $Li_5NI_2$, or $Li_6NBr_3$.

Further employed as supporting electrolytes may be electrolytes in gel form. When electrolytes are nonaqueous, it is possible to employ oil gelling agents described in paragraphs [0057]-[0059] of JP-A No. 11-185836.

[White Particles Added to the Electrolyte Layer]

In the display element of the present invention, it is preferable that the electrolyte layer incorporates white particles.

Examples of white particles include, for example, titanium dioxide (an anatase type or a rutile type), barium sulfate, calcium carbonate, aluminum oxide, zinc oxide, magnesium oxide, zinc hydroxide, magnesium hydroxide, magnesium phosphate, magnesium hydrogenphosphate, alkaline earth metal salts, talc, kaolin, zeolite, acid clay, glass, as well as organic compounds such as polyethylene, polystyrene, acryl resins, ionomers, ethylene-vinyl acetate copolymers, benzoguanamine resins, urea-formalin resins, melamine-formalin resins, and polyamide resins. These materials may be used individually or in the form of a composite mixture, as well as in a state containing, in the particles, voids which alter the refractive index.

In the present invention, among the above white particles, preferably employed are those composed of titanium dioxide, zinc oxide, and zinc hydroxide. Further employed may be those composed of titanium dioxide which has been subjected to a surface treatment employing inorganic oxides ($Al_2O_3$, AlO(OH), and $SiO_2$). In addition to such surface treatments, it is possible to use titanium dioxide which is subjected to a treatment employing organic compounds such as trimethylolethane, triethanolamine acetate or trimethyl silane.

Of these white particle materials, titanium oxide or zinc oxide are preferably used, in order to prevent coloring at a higher temperature or to increase reflectance of the display element which is influenced by the refractive index.

[Thickening Agents Added to an Electrolyte Layer]

In the display element of the present invention, thickening agents are preferably used in the electrolyte layer. Examples include: gelatin, gum Arabic, poly(vinyl alcohol), hydroxyethyl cellulose, hydroxypropyl cellulose, cellulose acetate, cellulose acetate butyrate, poly(vinylpyrrolidone), poly(alkylene glycol), casein, starch, poly(acrylic acid), poly(methylmethacrylic acid), poly(vinyl chloride), poly(methacrylic acid), styrene-maleic anhydride copolymer, styrene-acrylonitrile copolymer, styrene-butadiene copolymer, poly(vinyl acetals) (for example, poly(vinyl formal), poly(vinyl butyral)), poly(vinyl esters), poly(urethanes), phenoxy resins, poly(vinylidene chloride), poly(epoxides), poly(carbonates), poly(vinyl acetate), cellulose esters, poly(amides), as well as, as a transparent hydrophobic binder: polyvinyl butyral, cellulose acetate, cellulose acetate butyrate, polyester, polycarbonate, polyacrylic acid, and polyurethane.

These thickening agents may be employed in combinations of at least two types. Further listed are the compounds described on pages 71-75 of JP-A No. 64-13546. Of these, preferably employed compounds are polyvinyl alcohols, polyvinylpyrrolidones, hydroxypropyl celluloses, and polyalkylene glycols, in view of compatibility with various types of additives and enhancement of dispersion stability of white particles.

[Other Additives to the Electrolyte Layer]

In the present invention, listed as layers which may be provided between the pair of electrodes containing the electrolyte layer include ancillary layers such as a protective layer, a filter layer, an antihalation layer, a cross-over light cutting layer, or a backing layer. If required, incorporated in these ancillary layers may be various chemical sensitizers, noble metal sensitizers, photosensitive dyes, supersensitizers, couplers, high boiling point solvents, antifoggants, stabilizers, development inhibitors, bleach accelerators, fixing accelerators, color mixing inhibitors, formalin scavengers, toners, hardeners, surfacants, thickening agents, plasticizers, lubricants, UV absorbers, antirradiation dyes, filter light absorbing dyes, mildewcides, polymer latexes, heavy metals, antistatic agents, and matting agents.

The additives listed above are more detailed in Research Disclosure (hereinafter referred to as RD) Volume 176 Item/17643 (December 1978), RD Volume 184 Item/18431 (August 1979), DR Volume 187 Item/18716 (November 1979), and RD Volume 308 Item/308119 (December 1989).

Types of compounds and their citations in RD are listed below.

| Additives | RD 17643 | | RD 18716 | | RD 308119 | |
|---|---|---|---|---|---|---|
| | Page | Section | Page | Section | Page | Section |
| Chemical Sensitizers | 23 | III | 648 | right top | 96 | III |
| Sensitizing Dyes | 23 | IV | 648-649 | | 996-8 | IV |
| Desensitizing Dyes | 23 | IV | | | 998 | IV |
| Dyes | 25-26 | VIII | 649-650 | | 1003 | VIII |
| Development Accelerators | 29 | XXI | 648 | right top | | |
| Antifoggant Stabilizer | 24 | IV | 649 | right top | 1006-7 | VI |
| Optical Brightening Agents | 24 | V | | | 998 | V |
| Hardeners | 26 | X | 651 | left | 1004-5 | X |
| Surfactants | 26-7 | XI | 650 | right | 1005-6 | XI |
| Antistatic Agents | 27 | XII | 650 | right | 1006-7 | XIII |
| Plasticizers | 27 | XII | 650 | right | 1006 | XII |
| Lubricants | 27 | XII | | | | |
| Matting Agents | 28 | XVI | 650 | right | 1008-9 | XVI |
| Binders | 26 | XXII | | | 1003-4 | IX |
| Supports | 28 | XVII | | | 1009 | XVII |

[Layer Configuration]

The layer configuration between the pair of electrodes of the display element of the present invention will now be described in more detail.

As the layer configuration related to the display element of the present invention, it is possible to arrange a constituting layer containing positive hole transport materials. Examples of positive hole transport materials include aromatic amines, triphenylene derivatives, oligothiophenes, polypyrroles, polyacetylene derivatives, polyphenylene vinylene derivatives, polythienylene vinylene derivatives, polythiophene derivatives, polyaniline derivatives, polytoluidine derivatives, CuI, CUSCN, $CuInSe_2$, $Cu(In,Ga)Se$, $CuGaSe_2$, $Cu_2O$, CuS, $CuGaS_2$, $CuInS_2$, $CuAlSe_2$, GaP, NiO, CoO, FeO, $Bi_2O_3$, $MoO_2$, and $Cr_2O_3$.

[Substrates]

Preferably employed as substrates usable in the present invention may be synthetic plastic films, for example: polyolefins such as polyethylene or polypropylene; polycarbonate; cellulose acetate; polyethylene terephthalate; polyethylene dinaphthalene dicarboxylate; polystyrene naphthalate, polyvinyl chloride, polyimide, polyvinyl acetal, and polystyrene. In addition, preferred are syndioctatic structured polystyrenes. These are prepared employing the methods described, for example, in JP-A Nos. 62-117708, 1-46912, and 1-178505. Further listed examples include metal substrates including stainless steel, paper supports such as baryta paper or resin coated paper, substrates composed of the above plastic film having thereon a reflection layer, and those which are described in JP-A No. 62-253195 (pages 29-31). Further preferably employed are those described on page 28 of RD No. 17643, from the right column of page 647 to the left column on page 648 of RD No. 18716, and on page 879 of RD No. 307105. As described in U.S. Pat. No. 4,141,735, these substrates may be subjected to a thermal treatment at a temperature lower than Tg so that core-set curl is decreased. Further, the surface of these substrates may be subjected to a surface treatment with the aim of enhancement of adhesion of the substrate to other constituting layers. In the present invention, employed as surface treatments may be a glow discharge treatment, an ultraviolet ray irradiation treatment, a corona treatment and a flame treatment. Further employed may be substrates described on pages 44-149 of Kochi Gijutsu (Prior Art Technology) No. 5 (published by AZTEC Corp., dated Mar. 22, 1991). Further listed are those described on page 1009 of RD No. 308119, as well as in the item "Supports" on page 108 of Product Licensing Index Volume 92. Other than the above, employed may be glass substrates as well as epoxy resins kneaded with glass powder.

(Electrodes)

In the display element of the present invention, it is preferable that at least one of the pair of electrodes is a metal electrode. Employed as a metal electrode may be a metal such as platinum, gold, silver, copper, aluminum, zinc, nickel, titanium, or bismuth, as well as alloys thereof, which are known in the art. Preferred metals employed in the metal electrodes are those which exhibit a work function near the oxidation-reduction potential of silver in electrolytes. Of these, a silver electrode or an electrode containing silver in an amount of at least 80 percent is advantageous to maintain a reduced state of silver, and in addition, results in anti-staining of electrodes. Employed as methods for preparing electrodes may be conventional ones such as a evaporating method, a printing method, an ink-jet method, a spin coating method, or a CVD method.

Further, it is preferable that in the display element of the present invention, at least one of the pair of electrodes is a transparent electrode. Transparent electrodes are not particularly limited as long as they are transparent and electrically conductive. Examples include indium tin oxide (ITO), indium zinc oxide (IZO), fluorine containing tin oxide (FTO), indium oxide, zinc oxide, platinum, gold, silver, rhodium, copper, chromium, carbon, aluminum, silicon, amorphous silicon, and BSO (bismuth silicon oxide). Patterned electrode may be formed by, for example, mask depositing ITO layer by sputtering onto a substrate, or after forming an ITO layer on the entire surface, patterning the ITO layer employing a photolithographic method. The surface resistance is preferably 100 Ω/sq or less, but is more preferably 10 Ω/sq or less. The thickness of the transparent electrodes is not particularly limited but is commonly 0.1-20 μm.

[Other Components Constituting the Display Element]

If desired, employed in the display element of the present invention may be sealing agents, column-structured materials, and spacer particles.

Sealing agents are used to seal the display element so that the contents do not leak out. Employed as sealing agents may be a heat curable resin, a light curable resin, a moisture curable resin, or an anaerobic curable resin, for example, an epoxy resin, an urethane resin, an acryl resin, a vinyl acetate resin, an ene-thiol resin, a silicone resin, or a modified polymer resin.

Column-structure materials provides strong self-supporting nature (strength) between substrates. For example, listed may be a cylindrical form, a quadrangular form, an elliptic cylindrical form, and a trapezoidal form which are arranged at definite intervals in a specified pattern such as a lattice. Further, employed may be stripe-shaped ones arranged at definite intervals. It is preferable that the column-structure materials are not randomly arranged but arranged at an equal distance, arranged so that the interval gradually varies, or a predetermined pattern is repeated at a definite cycle so that the distance between substrates is appropriately maintained and image display is not hindered. When the column-structure materials are such that the ratio of the area occupied in the display region of a display element is 1 to 40 percent, sufficient strength for commercial use is obtained as a display element.

In order to maintain a uniform gap between paired substrates, provided may be spacers between them. As such spacers, exemplified may be spheres made of resins or inorganic oxides. Further, suitably employed are adhesion spacers the surface of which is coated with thermoplastic resins. In order to maintain the uniform gap between substrates, provided may only be column-structure materials. However, both spacers and column-structure materials may be provided. In place of the column-structured materials, only spacers may be employed as a space-maintaining member. The diameter of spacers, when a column-structure material is used, is not more than its height, but is preferably equal to the height. When the column-structure material is not used, the diameter of spacers corresponds to the distance of the cell gap.

[Screen Printing]

In the present invention, it is possible to form sealing agents, column-structure materials, and electrode patterns, employing a screen printing method. In screen printing methods, a screen on which predetermined patterns are formed is placed on an electrode surface, and printing materials (compositions to form column-structure materials, such as light-curable resins) are applied on the screen. Subsequently a squeegee is moved at predetermined pressure, angle and rate. By such action, the printing materials are transferred onto the above substrate via the pattern of the screen. Then, the transferred materials are cured and dried. When column-structure materials are formed employing the screen printing method, resinous materials are not limited to light-curable resins, but also employed, for example, may be heat curable resins such as epoxy resins or acryl resins, as well as thermoplastic resins. Listed as thermoplastic resins are polyvinyl chloride resins, polyvinylidene chloride resins, polyvinyl acetate resins, polymethacrylic acid ester resins, polyacrylic acid ester resins, polystyrene resins, polyamide resins, polyethylene resins, polypropylene resins, fluorocarbon resins, polyurethane resins, polyacrylonitrile resins, polyvinyl ether resins, polyvinyl ketone resins, polyether resins, polyvinylpyrrolidone resins, saturated polyester resins, polycarbonate resins, and chlorinated polyether resins. It is preferable that resinous materials are employed in the form of a paste while dissolved in suitable solvents.

As noted above, after forming the column-structure materials on the substrate, spacers are provided on at least one side of the substrate, and paired substrates are placed so that the electrode forming surfaces face each other, whereby a vacant cell is formed. By heating the paired facing substrates, they are allowed to adhere to each other under application of pressure from both sides, whereby a display cell is obtained. Preparation of a display element may be performed by injecting an electrolyte composition between the substrates, employing a vacuum injection method. Alternatively, during adhesion of substrates, an electrolyte composition may be dripped on the surface of one of the substrates and then sealed simultaneously with the adhesion of the substrates.

[Method for Driving Display Element]

In the display element of the present invention, it is preferable that the driving operation of the pair of electrodes described above is simple matrix drive.

In the display element of the present invention, a plurality of positive electrode lines and a plurality of negative electrode lines are placed face to face so that the positive electrode lines and the negative electrode lines cross in right angles. "Simple matrix drive", as described in the present invention, refers to the driving method in which electric current is sequentially applied to these positive electrode lines and negative electrode lines. By employing the simple matrix driving, it is possible to simplify the circuit structure and the driving IC, resulting in a lower production cost.

The display element of the present invention may be driven by active matrix drive. Active matrix drive refers to a system in which scanning lines, data lines, and current feeding lines are formed in a checkered pattern and drive is performed by a TFT circuit provided in each square of the checkered pattern. Since switching is performed in each pixel, active matrix drive has merits of gradation display as well as memory function.

[Fields in which the Display Element of the Present Invention is Applied]

The display element of the present invention may be applied to ID cards, public information services, transportation services, broadcasting, account settling services, and distribution and logistics services. Specific examples include door keys, student's identification cards, corporate member identification cards, various club membership cards, convenience store cards, department store cards, vending machine cards, gas station cards, subway and railroad cards, bus cards, cash cards, credit cards, highway cards, driver licenses, hospital medical examination cards, health insurance cards, residents' basic registers, and passports.

EXAMPLES

The present invention will now be described with reference to examples, but is not limited thereto.

<<Preparation of Display Elements>>

[Preparation of Display Element 1]

(Preparation of Electrolyte Solution 1)

Added to 2.5 g of dimethyl sulfoxides were 90 mg of sodium iodide and 75 mg of silver iodide, which were completely dissolved. Thereafter, 0.5 g of titanium oxide was added and subsequently dispersed, employing an ultrasonic homogenizer. Added to the resulting dispersion was 150 mg of polyvinyl alcohol (PVA245, produced by Kuraray Co., Ltd.) and the resulting mixture was stirred for one hour while heated at 120° C., whereby Electrolyte Solution 1 was obtained.

(Preparation of Transparent Electrode)

Lines of ITO film at a pitch of 150 μm were formed on a 1.5 mm thick 2 cm×4 cm glass substrate using a method known in a prior art, whereby a transparent electrode (Electrode 1) was obtained.

(Preparation of Metal Electrode)

Silver paste ink (DW-250H-5, produced by TOYOBO Co., Ltd.) was screen printed (thickness: 10 [μm]) at a pitch of 150 μm on a 1.5 mm thick 3 cm×4 cm glass substrate-and heated for 30 minutes in a vacuum oven at 150° C., whereby a silver electrode (Electrode 2) was obtained.

(Preparation of Display Element)

4% by volume of polyacrylic spherical beads of an average diameter of 20 μm were mixed with Electrolyte Solution 1 followed by agitating. The mixture was applied onto Electrode 2, and subsequently, Electrode 1 was placed on Electrode 2, followed by pressing at a pressure of 9.8 kPa, whereby Display Element 1 was prepared.

[Preparation of Display Elements 2-22]

Display Elements 2-22 were prepared in the same manner as the above Display Element 1, except that Electrolyte Solution 1 was replaced with Electrolyte Solutions 2-22 in which combinations of the types and added amount of silver salts, the types and added amount of various additives, as well as the types of solvents were varied as listed in Table 1.

Abbreviations of the additives listed in Table 1 stand for the following:

<Silver Salt>
TsAg: silver para-toluenesulfonate

<Additives>
A: 2,6-di-t-butyl-p-cresol
B: 2,2'-methylenebis-(4-methyl-6-butylphenol)
C: 1,1,3-tris-(2-methyl-4-hydroxy-5-t-butylphenyl)butane
D: 4,4'-butylidene-bis(3-methyl-6-t-butylphenylditridecyl) phosphite
E: distearyl-thiodipropionate
F: 4,4'-dioctyl-diphenylamine
G: 2,5-di-(t-amyl)hydroquinone
H: trimethylsilyl oxalate
I: magnesium sulfate
J: calcium carbonate
K: molecular sieve <Solvents>
DMSO: dimethylsulfoxide
DMF: dimethylformamide
DMAc: dimethylacetoamide
PC: propylene carbonate
EC: ethylene carbonate

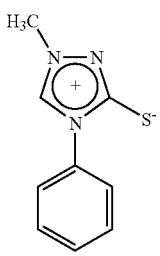
*1

-continued

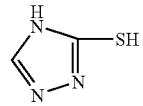
*2

<<Evaluation of Display Elements>>

(Driving Method)

Silver in an electrolyte underwent dissolution deposition reaction at an electric amount of 5 mC/cm² per pixel, employing a passive matrix driving circuit known in a prior art, whereby a white display (a silver dissolution state) and a black display (a silver deposition state) were switched.

(Evaluation of Durability at High Temperature and High Humidity)

Durability of display elements at high temperature and high humidity was evaluated based on the following procedures.

Each of the display elements prepared as above was placed in a hydrothermostat maintained at 80° C. and 60 percent relative humidity for one week to prepare a sample being subjected to accelerated aging. Subsequently, by employing an untreated sample and an acceleratedly aged sample, a variation ratio of the reflectance of the white display before and after the accelerated aging, and the variation ratio of the drive response rate before and after the accelerated aging were determined.

The changing ratio of reflectance of the white display was determined as follows. Spectral reflection spectra were determined employing a spectrophotometer. The ratio of (reflectance of a acceleratedly aged sample)/(reflectance of an untreated sample) at a wavelength of 450 nm was obtained, and was designated as the changing ratio of the reflectance of the white display.

The changing ratio of the driving response rate was determined as follows. At an applied voltage of 1.5 V, applying time to reach 10 percent of reflectance was determined, and the ratio of (time applied to the acceleratedly aged sample)/(time applyied to the untreated sample) was designated as the changing ratio of the driving response rate.

The closer to 1.0 these changing ratios are, the more durable at high temperature and high humidity the display element is.

The results were summarized in Table 1.

TABLE 1

| Display Element No. | Electrolyte Solution Composition | | | | | | | | | Durabirity at High Temperature and High Humidity | | |
|---|---|---|---|---|---|---|---|---|---|---|---|---|
| | Silver Salt | | Additive 1 | | Additive 2 | | Additive 3 | | | Changing Ratio of Reflectance | Changing Ratio of Driving Response Rate | Remarks |
| | Compound | Concentration (*A) | Compound | Concentration (*A) | Compound | Concentration (*A) | Compound | Concentration (*B) | Solvent | | | |
| 1 | AgI | 0.10 | NaI | 0.20 | — | — | — | — | DMSO | 0.50 | 0.61 | Comp. |
| 2 | AgI | 0.10 | NaI | 0.20 | — | — | A | 0.50 | DMSO | 0.60 | 0.74 | Inv. |
| 3 | AgI | 0.10 | NaI | 0.20 | — | — | B | 0.50 | DMF | 0.62 | 0.75 | Inv. |
| 4 | AgI | 0.10 | NaI | 0.20 | — | — | C | 0.50 | PC | 0.58 | 0.73 | Inv. |

TABLE 1-continued

| | Electrolyte Solution Composition | | | | | | | | | Durability at High Temperature and High Humidity | | |
|---|---|---|---|---|---|---|---|---|---|---|---|---|
| | Silver Salt | | Additive 1 | | Additive 2 | | Additive 3 | | | | Changing | |
| Display Element No. | Compound | Concentration (*A) | Compound | Concentration (*A) | Compound | Concentration (*A) | Compound | Concentration (*B) | Solvent | Changing Ratio of Reflectance | Ratio of Driving Response Rate | Remarks |
| 5 | AgI | 0.10 | NaI | 0.20 | — | — | D | 0.50 | DMSO | 0.63 | 0.76 | Inv. |
| 6 | AgI | 0.10 | NaI | 0.20 | — | — | E | 0.50 | DMAc | 0.60 | 0.77 | Inv. |
| 7 | AgI | 0.10 | NaI | 0.20 | — | — | F | 0.50 | DMF | 0.62 | 0.74 | Inv. |
| 8 | AgI | 0.10 | NaI | 0.20 | — | — | G | 0.50 | DMSO | 0.63 | 0.75 | Inv. |
| 9 | AgI | 0.10 | NaI | 0.20 | *1 | 0.40 | B | 0.50 | DMSO | 0.75 | 0.84 | Inv. |
| 10 | TsAg | 0.15 | — | — | *2 | 0.40 | D | 0.50 | PC | 0.77 | 0.85 | Inv. |
| 11 | AgI | 0.10 | NaI | 0.20 | — | — | ETA-1 | 0.30 | DMSO | 0.62 | 0.73 | Inv. |
| 12 | AgI | 0.10 | NaI | 0.20 | — | — | ETA-19 | 0.30 | DMSO | 0.61 | 0.71 | Inv. |
| 13 | AgI | 0.10 | NaI | 0.20 | — | — | ETA-33 | 0.30 | DMF | 0.59 | 0.73 | Inv. |
| 14 | AgI | 0.10 | NaI | 0.20 | *1 | 0.40 | ETA-1 | 0.30 | DMSO | 0.71 | 0.82 | Inv. |
| 15 | TsAg | 0.15 | — | — | *2 | 0.40 | ETA-19 | 0.30 | PC | 0.73 | 0.81 | Inv. |
| 16 | AgI | 0.10 | NaI | 0.20 | — | — | H | 0.20 | DMSO | 0.62 | 0.74 | Inv. |
| 17 | AgI | 0.10 | NaI | 0.20 | — | — | I | 0.20 | DMSO | 0.61 | 0.72 | Inv. |
| 18 | AgI | 0.10 | NaI | 0.20 | — | — | J | 0.20 | DMF | 0.62 | 0.73 | Inv. |
| 19 | AgI | 0.10 | NaI | 0.20 | — | — | K | 0.20 | DMSO | 0.59 | 0.69 | Inv. |
| 20 | AgI | 0.10 | NaI | 0.20 | *1 | 0.40 | I | 0.20 | DMSO | 0.78 | 0.83 | Inv. |
| 21 | AgI | 0.10 | NaI | 0.20 | — | — | *3 | *5 | DMSO | 0.84 | 0.85 | Inv. |
| 22 | TsAg | 0.15 | — | — | *2 | 0.40 | *4 | *6 | EC | 0.95 | 0.98 | Inv. |

*A: mol/kg
*B: weight %
*3: B/ETA-19
*4: D/ETA-19/I
*5: 0.5/0.3
*6: 0.5/0.3/0.2
Inv.: Inventive Sample
Comp.: Comparative Sample As shown in Table 1, the display element having the construction described in the present invention exhibits higher durability at high temperature and high humidity, compared to comparative examples.

What is claimed is:

1. A display element comprising a pair of electrodes having therebetween an electrolyte layer containing silver or a silver-containing compound, the display element being driven by the pair of electrodes so as to electrochemically dissolve silver or to electrochemically deposit silver,
   wherein the electrolyte layer contains an antioxidant selected from the group consisting of a phenolic antioxidant, a phosphoric acid antioxidant, a sulfur-containing antioxidant, an amine antioxidant and a hydroquinone derivative.

2. The display element of claim 1, wherein the electrolyte layer further contains a compound having a mercapto group and the electrolyte layer satisfies Formula (3):

$$2 \leq [-SH]/[Ag] \leq 10 \quad \text{Formula (3)}$$

wherein:
   [—SH] represents a total number of moles of sulfur contained in the compound having a mercapto group; and
   [Ag] represents a total number of moles of silver contained in the electrolyte layer.

3. The display element of claim 1, wherein the electrolyte layer further contains a solvent selected from the group consisting of:
   propylene carbonate, ethylene carbonate, ethylmethyl carbonate, diethyl carbonate, dimethyl carbonate, butylene carbonate, γ-butyrolactone, tetramethylurea, sulfolane, dimethyl sulfoxide, 1,3-dimethyl-2-imidazolidinone, 2-(N-methyl)-2-pyrrolidinone, hexamethylphosphortriamide, N-methylpropione amide, N,N-dimethylacetamide, N-methylacetamide, N,N-dimethylformamide, N-methylformamide, butyronitrile, propionitrile, acetonitrile, acetylacetone, 4-methyl-2-pentanone, 2-butanol, 1-butanol, 2-propanol, 1-propanol, ethanol, methanol, an acetic anhydride, ethylacetate, ethyl propionate, dimethoxy ethane, diethoxyfuran, tetrahydrofuran, ethylene glycol, diethylene glycol, triethylene glycol monobutyl ether, and water.

4. The display element of claim 1, wherein the electrolyte layer further contains white particles.

5. The display element of claim 1, wherein the electrolyte layer further contains a thickener selected from the group consisting of:
   polyvinyl alcohol, hydroxypropyl cellulose, polyalkylene glycol and polyvinyl pirrolidone.

6. The display element of claim 1, wherein one of the pair of electrodes is a metal electrode.

7. The display element of claim 1, wherein one of the pair of electrodes is a transparent electrode.

8. The display element of claim 1, wherein a display element operation is simple matrix drive.

9. A display element comprising a pair of electrodes having therebetween an electrolyte layer containing silver or a silver compound, the display element being driven by the pair of electrodes so as to electrochemically dissolve silver or to electrochemically deposit silver,
   wherein the electrolyte layer contains a compound represented by Formula (1) or Formula (2):

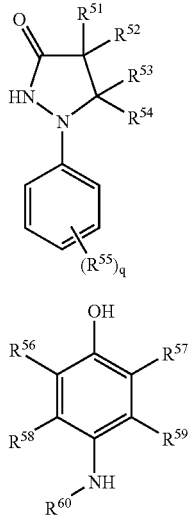

Formula (1)

Formula (2)

wherein in Formula (1) and Formula (2):

$R^{51}$-$R^{54}$ each represents a hydrogen atom, an alkyl group, a cycloalkyl group, an alkenyl group, an aryl group, or a heterocycle group;

$R^{55}$-$R^{59}$ each represents a hydrogen atom, a halogen atom, a cyano group, an alkyl group, a cycloalkyl group, an alkenyl group, an aryl group, a heterocycle group, an alkoxy group, a cycloalkyloxy group, an aryloxy group, a heterocyclicoxy group, a silyloxy group, an acyloxy group, an amino group, an anilino group, a heterocyclic amino group, an alkylthio group, an arylthio group, a heterocyclicthio group, a silyl group, a hydroxyl group, a nitro group, an alkoxycarbonyloxy group, a cycloalkyloxycarbonyloxy group, an aryloxycarbonyloxy group, a carbamoyloxy group, a sulfamoyloxy group, an alkanesulfonyloxy group, an arenesulfonyloxy group, an acyl group, an alkoxycarbonyl group, a cycloalkyloxycarbonyl group, an aryloxycarbonyl group, a carbamoyl group, a carbonamido group, a ureido group, an imido group, an alkoxycarbonylamino group, an aryloxycarbonylamino group, a sulfonamido group, a sulfamoylamino group, an alkylsulfinyl group, an arenesulfinyl group, an alkanesulfonyl group, an arenesulfonyl group, a sulfamoyl group, a sulfo group, a phosphinoyl group, or a phosphinoylamino group;

q represents a integer of 0 to 5, and when q is two or more, each $R^{55}$ may be different; and $R^{60}$ represents an alkyl group or an aryl group.

10. The display element of claim 9, wherein the electrolyte layer further contains a compound having a mercapto group, provided that Formula (3) is satisfied:

$$2 \leq [-SH]/[Ag] \leq 10 \quad \text{Formula (3)}$$

wherein:

[—SH] represents a total number of moles of sulfur contained in the compound having a mercapto group; and

[Ag] represents a total number of moles of silver contained in the electrolyte layer.

11. The display element of claim 9, wherein the electrolyte layer further contains a solvent selected from the group consisting of:

propylene carbonate, ethylene carbonate, ethylmethyl carbonate, diethyl carbonate, dimethyl carbonate, butylenes carbonate, γ-butyrolactone, tetramethylurea, sulfolan, dimethyl sulfoxide, 1,3-dimethyl-2-imidazolidinone, 2-(N-methyl)-2-pyrrolidinone, hexamethylphosphortriamide, N-methyl propione amide, N,N-dimethylacetamide, N-methylacetamide, N,N-dimethylformamide, N-methylformamide, butyronitrile, propionitrile, acetonitrile, acetylacetone, 4-methyl-2-pentanone, 2-butanol, 1-butanol, 2-propanol, 1-propanol, ethanol, methanol, acetic anhydride, ethyl acetate, ethyl propionate, dimethoxy ethane, diethoxyfuran, tetrahydrofuran, ethylene glycol, diethylene glycol, tri ethylene glycol monobutyl ether, and water.

12. The display element of claim 9, wherein the electrolyte layer further contains white particles.

13. The display element of claim 9, wherein the electrolyte layer further contains a thickener selected from the group consisting of:

polyvinyl alcohol, hydroxypropyl cellulose, polyalkylene glycol and polyvinyl pirrolidone.

14. The display element of claim 9, wherein one of the pair of electrodes is a metal electrode.

15. The display element of claim 9, wherein one of the pair of electrodes is a transparent electrode.

16. The display element of claim 9, wherein a display element operation is simple matrix drive.

17. A display element comprising a pair of electrodes having therebetween an electrolyte layer containing silver or a silver compound, the display element being driven by the pair of electrodes so as to electrochemically dissolve silver or to electrochemically deposit silver, wherein the electrolyte layer contains a dehydration agent.

18. The display element of claim 17, wherein the electrolyte layer further contains a compound having a mercapto group, provided that Formula (3) is satisfied:

$$2 \leq [-SH]/[Ag] \leq 10 \quad \text{Formula (3)}$$

wherein:

[—SH] represents a total number of moles of sulfur contained in the compound having a mercapto group; and

[Ag] represents a total number of moles of silver contained in the electrolyte layer.

19. The display element of claim 17, wherein the electrolyte layer further contains a solvent selected from the group consisting of:

propylene carbonate, ethylene carbonate, ethylmethyl carbonate, diethyl carbonate, dimethyl carbonate, butylenes carbonate, γ-butyrolactone, tetramethylurea, sulfolan, dimethyl sulfoxide, 1,3-dimethyl-2-imidazolidinone, 2-(N-methyl)-2-pyrrolidinone, hexamethylphosphortriamide, N-methyl propione amide, N,N-dimethylacetamide, N-methylacetamide, N,N-dimethylformamide, N-methylformamide, butyronitrile, propionitrile, acetonitrile, acetylacetone, 4-methyl-2-pentanone, 2-butanol, 1-butanol, 2-propanol, 1-propanol, ethanol, methanol, acetic anhydride, ethyl acetate, ethyl propionate, dimethoxy ethane, diethoxyfuran, tetrahydrofuran, ethylene glycol, diethylene glycol, tri ethylene glycol monobutyl ether, and water.

20. The display element of claim 17, wherein the electrolyte layer further contains white particles.

21. The display element of claim 17, wherein the electrolyte layer further contains a thickener selected from the group consisting of:

polyvinyl alcohol, hydroxypropyl cellulose, polyalkylene glycol and polyvinyl pirrolidone.

22. The display element of claim 17, wherein one of the pair of electrodes is a metal electrode.

23. The display element of claim 17, wherein one of the pair of electrodes is a transparent electrode.

24. The display element of claim 17, wherein a display element operation is simple matrix drive.

* * * * *